US008547995B2

(12) United States Patent
Gelke et al.

(10) Patent No.: US 8,547,995 B2
(45) Date of Patent: Oct. 1, 2013

(54) HIGH DEFINITION VIDEO/AUDIO DATA OVER IP NETWORKS

(75) Inventors: Hans-Joachim Gelke, Zürich (CH); Angelo Banfi, Baden (CH); Rudolf Rohr, Wettingen (CH)

(73) Assignee: Barox Kommunikation AG, Dättwil (CH)

( * ) Notice: Subject to any disclaimer, the term of this patent is extended or adjusted under 35 U.S.C. 154(b) by 322 days.

(21) Appl. No.: 12/951,533

(22) Filed: Nov. 22, 2010

(65) Prior Publication Data
US 2011/0122877 A1    May 26, 2011

Related U.S. Application Data

(60) Provisional application No. 61/264,508, filed on Nov. 25, 2009.

(51) Int. Cl.
*H04L 12/66* (2006.01)

(52) U.S. Cl.
USPC ............ 370/463; 370/419; 725/147; 725/152

(58) Field of Classification Search
USPC .................. 370/400; 725/135, 147, 152, 153
See application file for complete search history.

(56) References Cited

U.S. PATENT DOCUMENTS

| | | | | |
|---|---|---|---|---|
| 5,757,998 | A * | 5/1998 | Thatcher et al. | 385/75 |
| 6,665,497 | B1 * | 12/2003 | Hamilton-Gahart et al. | 398/135 |
| 7,606,535 | B2 * | 10/2009 | Shen et al. | 455/67.15 |
| 7,899,045 | B2 * | 3/2011 | Shankara | 370/389 |
| 7,984,478 | B2 * | 7/2011 | Le Crom et al. | 725/151 |
| 8,140,005 | B2 * | 3/2012 | Runyon et al. | 455/12.1 |
| 2005/0221764 | A1 * | 10/2005 | Shen et al. | 455/67.15 |
| 2006/0171689 | A1 * | 8/2006 | Smith | 386/125 |
| 2007/0033289 | A1 * | 2/2007 | Nuyttens et al. | 709/230 |
| 2007/0184813 | A1 * | 8/2007 | Pascht et al. | 455/349 |
| 2007/0199043 | A1 * | 8/2007 | Morris | 725/143 |
| 2008/0155635 | A1 * | 6/2008 | Johnson et al. | 725/118 |
| 2008/0172708 | A1 * | 7/2008 | Perry et al. | 725/110 |
| 2009/0232505 | A1 * | 9/2009 | Degan et al. | 398/101 |
| 2011/0010734 | A1 * | 1/2011 | Newell | 725/31 |

FOREIGN PATENT DOCUMENTS

EP    2094012 A1 *  8/2009

OTHER PUBLICATIONS

Ravi Budruk et al., PCI Express System Architecture, Addison-Wesley Professional, Sep. 14, 2003, p. 567, 689-690.*
Wikipedia, Device Driver.*

* cited by examiner

*Primary Examiner* — Michael J Moore, Jr.
(74) *Attorney, Agent, or Firm* — Renner, Otto, Boisselle & Sklar, LLP (57) ABSTRACT

Both the transmitter unit VTB and the receiver unit VRB feature a modular structure consisting of a base module or baseboard common to both units and one or more exchangeable adapter cards attached to or inserted into the baseboards to perform selected functions. The basebord is unitary; its components are activated depending upon the baseboard being in a VTB or a VRB. Each card is unique and earmarked and serves a specific purpose, e.g. for video coding and decoding, SMPTE processing, clocking/re-clocking, audio embedding/extraction. Upon inserting a card into a baseboard, the earmark is identified and the baseboard configured as transmitter or receiver baseboard. Functions in the baseboard can be implemented in Field Programmable Gate Arrays (FPGAs) and the network management, configuration, and/or control of the transmitting and/or receiving processes be performed by a softcore processors.

20 Claims, 10 Drawing Sheets

HIGH DEFINITION VIDEO/AUDIO DATA OVER IP NETWORKS

CROSS-REFERENCE TO RELATED APPLICATION

This application claims priority under 35 U.S.C. §119 to U.S. Provisional Application No. 61/264,508, filed Nov. 25, 2009, the entire disclosure of which is incorporated herein by reference.

TECHNICAL FIELD OF THE INVENTION

The present invention concerns an improved system and method for the transmission of at least High Definition (HD) video/audio data, e.g. a JPEG2000-compressed video stream plus a compressed or uncompressed multi-channel audio stream, over a packet switching network, e.g. an Ethernet or IP network. Both the transmitter and the receiver feature a modular structure with at least one module common to both, preferably a base module or baseboard. Coding, and/or other processing at the transmitter is performed by exchangeable adapter modules, as is scaling, decoding, and/or similar processing at the receiver. These adapter modules are attached to the baseboard which provides power and selected functions necessary for the transmission. Functions both in the base and the adapter modules may be implemented in Field Programmable Gate Arrays (FPGAs). A processor, preferably a soft-core processor in the base module, provides for network management and configuration. The inventive combination of modular hardware and software results in a cost-effective, reliable and, above all, fast and coherent transmission of voluminous data quantities.

BACKGROUND AND PRIOR ART

The transmission of HD video/audio data, in particular HD Television (HDTV or just HD), requires the processing of extremely high data rates both at the transmitter and the receiver. This is because HDTV has a resolution much higher than traditional television systems, about one million pixels per frame as 720p or about two million pixels per frame as 1080i. This is roughly five times that of standard TV. A further doubling of the data rate to be transmitted is required when 50 frames per second (fps) instead of the usual 25 fps shall be displayed. 50 fps avoids blur particularly for moving objects and thus results insignificantly better pictures.

Today, full high definition video/audio information, e.g. 1080i 50 fps or 1080p 60 fps, is mostly sent over proprietary links which are usually not compliant to the Internet Protocol (IP). Though it would be very advantageous to use the IP for such transmissions, there are numerous problems connected with transmitting and synchronizing of HD video/audio data over an IP network or using the IP in a non-IP network. If HD video/audio content is transmitted using the IP, other use of the IP network is limited because of the bandwidth needed: using H.264 (MPEG-4/AVC) introduces high latency and using JPEG or Motion JPEG results in image quality limitations. JPEG2000, which solves some of the problems, is presently available only for professional high-end, i.e. expensive, equipment.

The usual way to transmit or broadcast HD video/audio data over a packet switching network, e.g. an Ethernet, IP, or UDP network, is to compress the video frames and, optionally, the audio data, and divide, better: pack, the compressed frames into a series of packets. Packet switching networks have the advantage that the utilization of the network capacity is optimized, the response times are minimized, and the robustness of communication is increased. However, when the packets traverse network adapters, switches, and other network nodes, they must be buffered and queued which results in variable delays, depending on the traffic load in the network. This is one of the inherent problems of transmitting HD video/audio data over packet switching networks.

Packet switching of video/audio data requires that the sending device or transmitter unit forms packets and identifies each of them. This is achieved by adding a header which contains at least a time stamp and a sequence number; in addition, the first packet of a video frame contains a so-called M flag. This identification allows to rearrange the packets into the correct sequence at the receiver. To generate the time stamps, the transmitter unit contains a timer, usually crystal-controlled, which increments with a fixed frequency.

When transmitting video/audio data, the video data packets are usually generated and transmitted separately from the audio packets. Also, the audio data, often multiplexed from several audio channels, are generally of a much smaller size than the video data.

In this so-to-speak textbook approach for transmitting video/audio data, whether HD or not, over a packet switching network, the receiver must be able to generate from the received video and audio packets an uninterrupted, "lip-synchrous" video/audio data stream with as little delay as possible. All this must be performed reliably and with high throughput. Obviously this is not an easy task and requires solving a number of problems when HD video/audio data are to be transmitted.

One of these problems is the synchronization of the audio with the video data. Take a movie for example: the spoken word must be well synchronized with the lips of the person speaking. This is a problem because, usually, the video data are transmitted separately from the audio data.

A second problem is the unavoidable delay. As mentioned above, this problem is generic to packet switching networks because each packet is transmitted separately so that the packets may well arrive at the receiver in another sequence and/or with different delays as they were originally sent. The solution is to buffer and rearrange the packets to obtain a usable data stream.

A third problem is that all that has to be performed without interruption or delay—or any delay, in particular a varying delay, must be hidden, i.e. made invisible because the customer sitting in front of a HDTV display will not accept—and perhaps even pay for—a movie that comes with unintended and unwanted breaks.

Reasons for the above-mentioned problems are manifold. The compressed HD video images differ in size depending on picture contents and compression rate. Also, compression and decompression needs time and thus introduces delays. Further, as mentioned above, transmission over Ethernet or an IP network or any other packet switching network introduces variable delays between transmitter and receiver depending on the load of the net and the distance between receiver and transmitter. The receiver however must produce video images at a precise rate. Even further, since the transmitter and receiver clocks cannot but run asynchronously, even the smallest difference will result in distortions, e.g. cause a video image to blur or tear at one point in time. Finally, the audio information is difficult to synchronize with video information because of the separate transmission.

There are state-of-the-art JPEG2000 encoder/decoder ICs available, e.g. from Analog Devices in Norwood, Mass., USA, but, apart from their still high price, the maximum frequency of those presently available would be exceeded when compressing 1080p 60 fps HD video. Splitting the load onto several JPEG2000 encoder/decoders would introduce more latency/delay, depending on how the load is split amongst the processors. A less expensive solution would be to implement transmitter and receiver in ASICs, but this would also lower the flexibility.

The present invention provides a solution for these and other problems by furnishing a cost-effective, dynamic system for transmitting HD audio/video data over an IP network.

THE INVENTION

In brief, the invention is an intelligent combination of several hardware and software components and processing steps to achieve the above-mentioned objectives. These components and processing steps will be—in principle—explained in the following.

The invention is a modular system for transmitting digital High Definition (HD) video/audio data received from external video or audio sources in a packet switching network which may be a point-to-point or point-to-multipoint system. The system includes a transmitter (further down named "VTB" for Video Transmitter Box) generating data packets and a receiver (in the following named "VRB" for Video Receiver Box) for receiving said data packets. The VTB time-stamps the generated data packets and the VRB assigns a receiver time-stamp to each data packet. The video data is separated from the audio data for the transmission. Each VTB and each VRB consists of at least two modules, a first module or baseboard and a second module or card plugged-in into said baseboard. The baseboard is unitary, i.e. identical for both the VTB and the VRB; its components are activated and used depending on the selection taken, i.e. depending upon the baseboard constituting a transmitter baseboard or a receiver baseboard. In contrast, each card is unique and serves a specific purpose, often as transducer or converter for e.g. receiving analog audio or video data and transferring/transcribing these into digital audio or video data.

Each baseboard includes a plurality of preferably identical plug-in positions or slots for taking up the cards and, of course, at least one interface or port connecting said baseboard to the packet switching network. It also includes means, e.g. software, for identifying the type of card or cards plugged in and, depending on the plugged-in card, for "organizing", i.e. configuring the baseboard either as a transmitter baseboard or a receiver baseboard.

Preferably, each baseboard contains an FPGA (see FIG. 10) which includes a softcore processor used for network management and configuration. Each baseboard includes, as described further down, other components being activated or deactivated depending on the desired functionality of the baseboard.

Each card, on the other hand, includes a card interface compatible with one of the slots of a baseboard, i.e. to allow the card to be plugged into the baseboard. Each card also includes an identifier or earmark which characterizes the card either as a card for a transmitter or VTB, named "VTB card" in the following, or as a card for a receiver or VRB, named "VRB card" in the following. This identifier may be implemented as hardware, e.g. as a specific interface or contact design, or it may be preferably implemented as software. Either way, it must be designed such that the receiving baseboard can identify the type of card, because, as mentioned above, the baseboard must be able to switch the baseboard into a transmitter or receiver configuration.

Furthermore, each card has an "external" interface for connecting it—in the case of a VTB card—to an external video or audio source or—in the case of a VRB card—to an external sound or display system.

When the modular system according to the invention is set up and the necessary cards are plugged into the baseboards, each baseboard recognizes or identifies the type of card plugged-in, i.e. whether it is a transmitter card or a receiver card, and switches the baseboard to the transmitter or to the receiver function, respectively.

An important advantage achieved by this is that the same baseboard can be used on both the transmitting end and the receiving end of the system, which, combined with the automatic identification of the cards and the automatic switching of the baseboards, allows a very fast implementation and adaptation of user-defined, arbitrary broadband networks. It should be clear that each of the baseboards according to the invention implements all functions for transmitting as well as for receiving, but only those functions necessary for the specific use are activated, i.e. switched on. This will be explained in more detail further down.

One important function implemented on each modular baseboard is a timing system necessary because of the inherent asynchronism between transmitter and receiver in a packet switching network. This asynchronism is intrinsic because the crystal oscillator for clocking the frame processing on the VTB and the crystal oscillator on the VRB never has exactly the same frequency. Furthermore, the packages sent from a transmitter via a packet switching network to a receiver will rarely arrive in the same sequence and with the same speed at this receiver.

This asynchronism problem is solved in the following way. The transmitter unit contains a transmitter timer which increments with a fixed crystal frequency. Each data packet, e.g. a HD video packet, delivered to the network is time-stamped by this transmitter timer, each packet carrying its header which includes the transmitter time stamp and, optionally, the M flag.

Contrary to that, the timer of the receiver is adaptive, i.e. it can adjust its increments according to certain inputs. To accomplish this, the receiver timer is driven by a crystals clock with a fixed frequency and increments only after multiple, i.e. a number of, clocks of the fixed input frequency. The increments of the receiver timer are adjusted through a control input which determines the number of increments necessary for an advance of the receiver timer output. This control input is governed by a processor (CPU) implemented on the baseboard and "managing" the receiver.

Each data packet received by a receiver connected to the network is stored in an input FIFO together with the current value of the receiver timer. The data packets stored in this input FIFO are read out by a Video Stream Out (VSO) and filtered to obtain the previously assigned receiver timer value and the time stamp specified by the transmitter. The two time values are stored in a time stamp FIFO which can be accessed, i.e. read by the receiver CPU.

From these two time values the CPU in the receiver determines and adjusts the value for the increment frequency necessary for an advance of the receiver timer output in the following way:

The receiver timer increment frequency is decreased when the compare value of the receiver timer and transmitter time stamp stored in the time stamp FIFO is negative. A negative compare value indicates that the receiver timer in average is running too fast, thus the receiver increment output is slowed down.

The receiver timer increment frequency is increased when the compare value of the receiver timer and transmitter time stamp stored in the time stamp FIFO is positive. A positive compare value indicates that the receiver timer in average is running too slow, thus the receiver increment frequency is speeded up.

When the data packets stored in the receiver's input FIFO are read out and filtered by the above-mentioned VSO to obtain the previously assigned receiver timer value and the time stamp specified by the transmitter, the VSO also determines whether there is an M bit or flag in the packet examined. If so, and if the receiver timer is larger or equal to the transmitter time stamp, a VSO-Vsync pulse is generated by the VSO. The VSO-Vsync pulse signals to the subsequent processing component, here the decoder stream interface, that the packet is the beginning of a video frame.

Another issue is cost.

Here, the specific modularization of the system according to the invention both on the sending and the receiving side is advantageous. In principle, each transmitter or sender and each receiver comprises at least two modules:

a first module, the "baseboard" which is identical for both the transmitter and the receiver, this baseboard being equipped for, e.g. supplying power, providing a clocking or timing system, allocating mechanical and electrical adapters, connectors, contacts, transmitting or receiving data packets to/from the network, etc., and a second module, the "adapter card" or "card" for short, being (1) either one of a plurality of dedicated and earmarked "VTB cards" to be used in a VTB and equipped for, e.g. receiving video and/or audio data from video and/or audio sources, coding received video and/or audio data, delivering coded and/or uncoded digital data to the baseboard, etc., (2) or one of a plurality of dedicated and earmarked "VRB cards" to be used in a VTB and equipped for, e.g. obtaining digital data from the baseboard, decoding and unpacking such digital video and/or audio data, producing digital or analog output signal streams, delivering such output streams to displays and/or loudspeakers, etc.

The earmarking and automatic recognition or identification of a card when it is plugged into a baseboard is a key feature of this modular concept since it provides a simple and fast way to set up, modify, enlarge, reduce, etc., any transmission system according to the invention. This concept allows for example to extend a one-to-one transmission system quickly into a broadcasting system with a single transmitter and many receivers, if necessary on the fly.

A further issue are delays or latency in a packet switching network. This is a particularly severe problem when transmitting video/audio data.

Here, the invention provides a solution by means and functions on each baseboard for measuring the system's throughput before a connection is established. The latter is identified by measuring the round trip time of the network connection and by providing sufficient buffer content particularly at the receiver, accomplished by including adequate memory, usually FIFO buffer content, physically implemented in RAM with boundaries defined by SW. RAM can easily be upgraded by a simple design change. Here again, the modular structure of the system according to the invention provides a flexibility unknown before.

The solution in some more detail is to monitor various statuses, comprising, e.g., controlling the buffer fill status at the transmitter and/or monitoring the number of lost frames at the receiver and/or the delay in the network. The monitored status or statuses then control the latency or delay of the buffer or buffers at the receiver.

The system controls memory content, as will be explained further down, by adding delay to the reference time of the receiver, thus determining the amount of data kept in the buffer(s).

The above-described modular concept has the advantage of being extremely flexible because the cards can not only be selected according to the needs and the available technical and/or financial resources, but can be changed without requiring additional design or adaptation effort, even by personnel having only limited technological knowledge.

To achieve this adaptability in such a complex environment as herein addressed, the adapter cards are constructed such that, upon being inserted or plugged into the baseboard, they "tell" the baseboard which function they perform, which power they require, what their inputs and outputs are, etc. This is preferably done by a memory chip on the adapter card whose contents is read out by the baseboard before data drivers are enabled.

Another advantage of this design is that the system can be adapted easily to differing requirements as concerns transmission capacity. This is achieved by providing the possibility to change, i.e. increase or decrease, the compression ratio. This can even be done "in flight" with live video, i.e. without visible interruption.

So can the coding of 1080p 60 fps video data be split over four encoder circuits in a baseboard on the transmitter side. Accordingly, the decoding of the transmitted 1080p 60 fps video data is split over four decoders in a baseboard on the receiver side. For example may two of the four encoder/decoder circuits process luma (luminance) and two other of the four encoder/decoder ICs process chroma (chrominance). Furthermore, two of the four encoder/decoder circuits process the first half of a line and the other two of the four encoder/decoder ICs process the second half of this line. If, at any time, a lower video resolution is required, i.e. lower than 1080p 60 fps, only three or less encoder or decoder circuits are used.

The following description of an embodiment of the invention shows and explains details which are only summarily addressed above.

DESCRIPTION OF AN EMBODIMENT

Below, an embodiment of the invention with various modifications is described in conjunction with the drawings, as follows.

The system described in the following is capable of transmitting a JPEG2000-compressed video stream over an Ethernet/IP network. Audio and video inputs and outputs are located on exchangeable adapter cards connected to a baseboard. The adapter cards include, e.g. for a VTB an HDMI input card, a Serial Digital Interface (SDI) input card, and/or an analog audio input card. For a VRB, an HDMI output card, a Serial Digital Interface (SDI) output card, and/or an analog audio output can be implemented.

Figure 1:
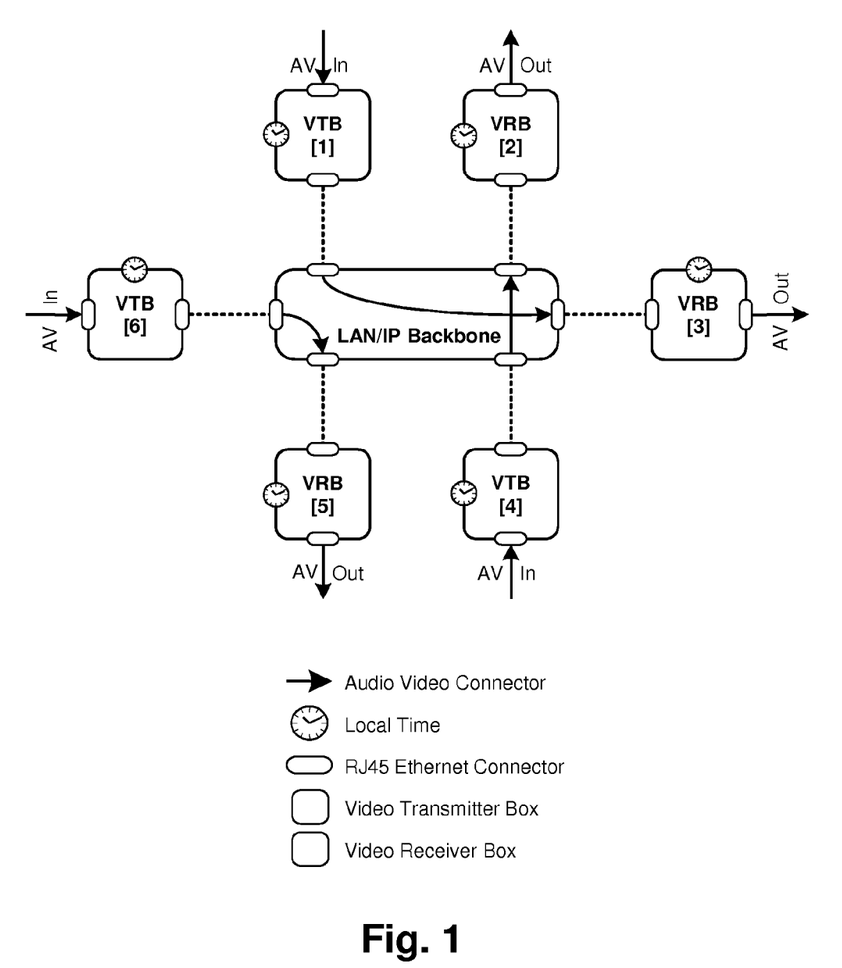
FIG. 1 a network with some video transmitter boxes (VTBs) and video receiver boxes (VRBs)

FIG. 1 shows a network connecting three VTBs with three VRBs in a one-to-one configuration via an IP backbone, i.e. each VTB connects to one remote VRB. A VTB connected to a VRB will be referred to as a video box pair; there are three such pairs shown in FIG. 1. Each pair is defined through configuration software by registering a VRB to a VTB. The registration allows the VRB to tell the VTB its capabilities of output formats, as the formats depend on the output devices, e.g. TV, projector, etc., connected to the VRB.

When a pair connection is established, the VTB acts as an audio/video sink with basically the same capabilities as the VRB. According to the abilities of the boxes used, the capabilities announced by the VTB can be reduced or expanded. A reduction could be for example the limitation of the resolution.

As mentioned above, both the VRB and the VTB use the same baseboard: a VRB is established when a baseboard is equipped with a video and/or audio VRB card and a VTB is established when a baseboard is equipped with a video and/or audio VTB card. Mechanically, a baseboard is designed to fit in half the width of a standard 19" housing.

Adapter cards, just named "cards" in the following, are equipped with a small autonomous data storage which can be read out by the baseboard. Information from this data storage is used by the baseboard to determine type and capabilities of the card. The card connector pinout defines power pins, digital data I/O pins, and pins for reading out the data storage device. The data I/O pins can individually be configured as inputs, outputs or bidirectional by the baseboard. Configuration of the I/O pins by the baseboard is accomplished only after a module is recognized or identified by the baseboard. The ability to configure I/O pins allows very great flexibility in the kind of modules used.

In this distributed system, different devices run on different asynchronous local times, as the IP backbone is not clock-transparent. The watch symbols shown in FIGS. 1 through 5 stand for this. The input audio/video stream, being asynchronous in respect to the VTB, needs to be output by the VRB with the same speed as recorded by the VTB, thus a rate or speed matching from the VRB to the VTB must be implemented.

Since the information is sent over a multi-user network, neither frame propagation delay nor available bandwidth are stable over time. Also, since video and audio streams are transmitted independently, the streams must be synchronized at the receiver. This is done in the following way.

Figure 5:
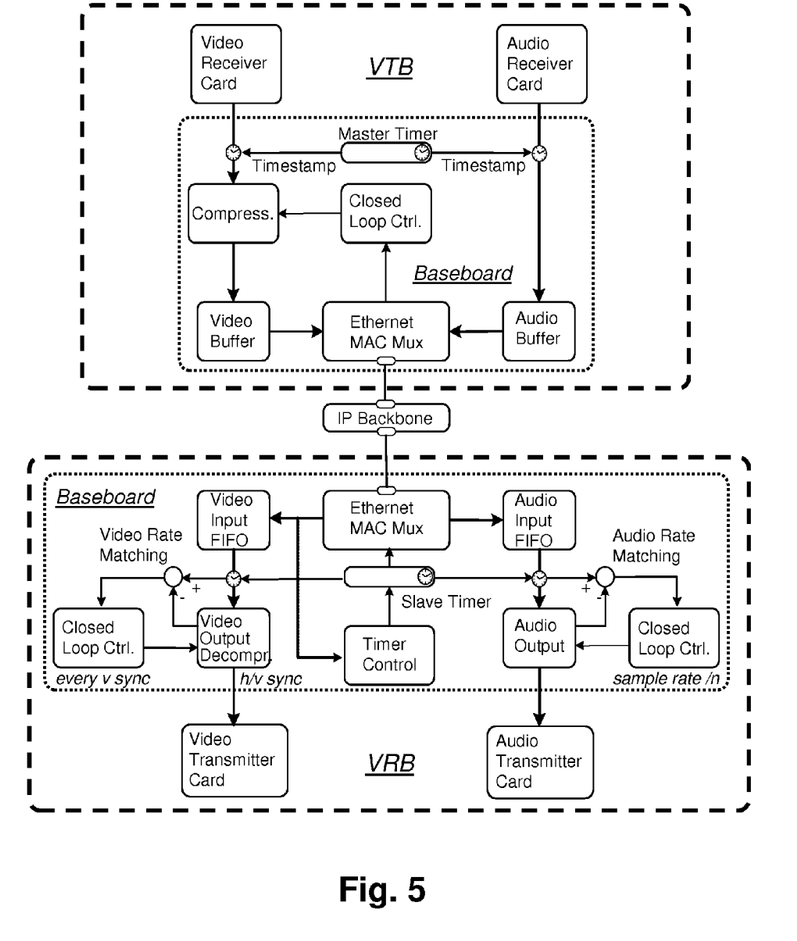
FIG. 5 a pair of a typical VTB and a typical VRB showing their respective modular structure.

Video and audio streams are synchronized in a VRB by placing the time-stamped frames into the Video and Audio input FIFOs shown in FIG. 5. The speed in which these input FIFOs are read out is controlled by a slave timer. There are three control loops to synchronize video and audio:
1. The first control loop synchronizes the slave timer to the master timer of the transmitter.
2. The second control loop provides the rate matching for the video card output.
3. The third control loop provides the rate matching for the audio output Details of these mechanisms are described further down.

Figure 2:
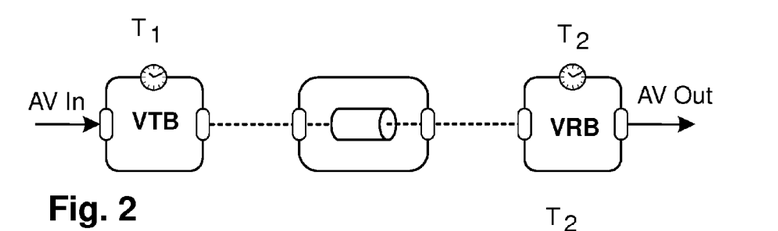
FIG. 2 a single pair of a VTB and a VRB.

FIG. 2 shows a single pair of a VTB and a VRB connected via a LAN. Again, as mentioned above, the VTB and the VRB run on different asynchronous local times as the LAN is not clock-transparent. The same applies to the structures shown in FIGS. 3 and 4.

Figure 3:
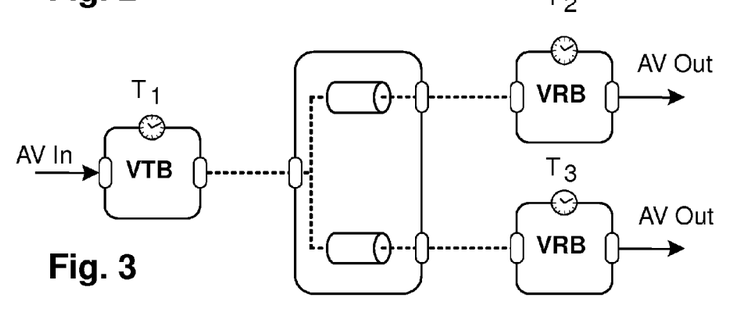
FIG. 3 a "broadcasting" arrangement with a single VTB and two VRBs

FIG. 3 depicts a "broadcasting" arrangement consisting of a single VTB and two VRBs. Usually the two (or more) VRBs will be running independently and, because of different signal delays in the two branches, asynchronously. There are situations where synchronism of the VRBs is required, i.e. when the outputs, e.g. loudspeakers and displays, of two or more VRBs are located in a single room. In such a case, synchronism of video and audio is a necessity.

This synchronism is accomplished by synchronizing slave timers of the two (ore more) VRBs. The time differences between several VRBs, caused by different delays introduced during transmission via the backbone, are compensated in each VRB through an individual offset value for each slave timer. These offset values are determined by a time synchronization protocol running between VRBs and VTBs. Details of this synchronization method are described further down.

Figure 4:
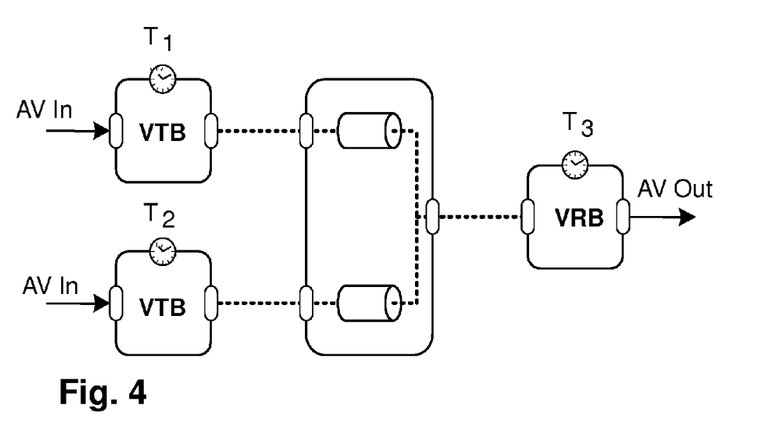
FIG. 4 an "inverse broadcasting" layout with two VTBs and one VRB.

FIG. 4 shows the so-to-speak "opposite" or "inverse broadcasting" arrangement of FIG. 3, namely an arrangement consisting of two VTBs communicating with a single VRB. Needless to say that there may be more than two VTBs connected to a single VRB. The problem to be solved in this arrangement is that a first VTB configured for transmitting audio only and a second VTB configured for transmitting video only are contained in the same location, transmitting their contents to a single VRB at a distant location, where both audio and video must be reproduced lip-synchronous. In this arrangement, the two VTBs are synchronized by defining one of the VTBs as the master. The offset values for each slave timer are then determined by a time synchronization protocol running between the VRB and the two VTBs.

FIG. 5 shows the detailed structure and the data flow through a video box pair of a single VTB and a single VRB as shown in principle in FIG. 2 above. The upper part is the VTB, the lower part shows the VRB, in between is the network, here identified as "IP backbone".

In the VTB shown in FIG. 5, the uncompressed video stream, entering the VTB via VTB card is time-stamped by a master timer which is clocked by a constant and stable crystal oscillator. This master timer also time-stamps the uncompressed audio stream. In the VRB, these time stamps are recovered and a slave timer is adjusted such that transmitter and receiver run in sync. The following describes this in more detail.

Figure 6:
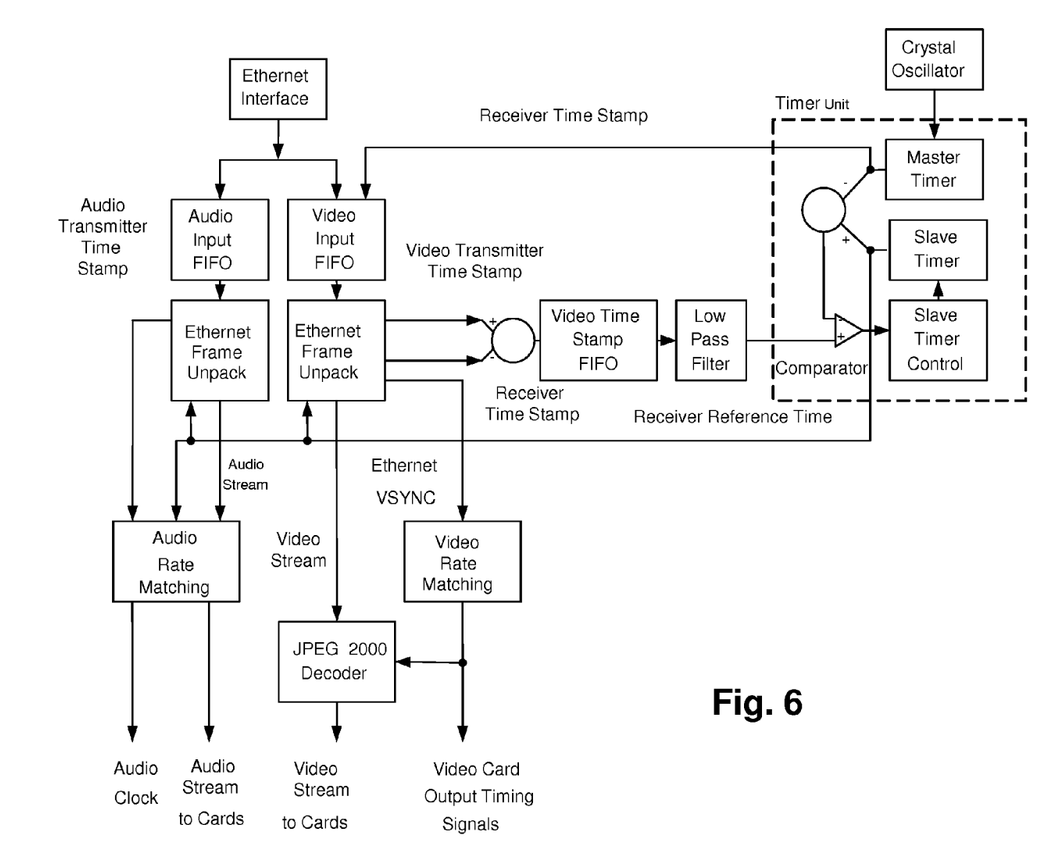
FIG. 6 the timing system on a baseboard, as used for a VRB.

FIG. 6 depicts a baseboard configured as a VRB. As shown, the input of the VRB receives VTB-time-stamped video and audio frames from an IP backbone, here the Ethernet. The received frames are fed into input video buffers, an Audio Input FIFO and a Video Input FIFO. The video frames are stored in the Video Input FIFO together with time stamps generated by the Master Timer of the VRB.

The frame vertical synchronisation pulses incoming via the Ethernet and generated when a new video frame arrives are not suitable to control the video timing of the VRB cards, since they are not synchronized to their Output Pixel Clock and HSYNC, VSYNC signals. Therefore a Video Rate Matching unit generates Video Card Output Timing Signals according to the desired video standard and controls the output of the frames from the JPEG2000 Encoder.

The Timer Unit consists of a Master Timer, running on a fixed crystal frequency, and a Slave Timer. As mentioned, the output of the Master Timer timestamps the received input frames stored in the Video Input FIFO. Thus each frame in this FIFO now carries two timestamps, a transmitter time stamp received with the frame and a receiver time stamp generated locally in the VRB.

At the Video Input FIFO's output, the video transmitter time stamp and the receiver time stamp are extracted from the data stream by the Ethernet Frame Unpack unit and the difference is calculated, i.e. the two timestamps' values are subtracted from each other. The difference is fed into a Video Time Stamp FIFO. At the output of this FIFO, the difference is lowpass-filtered and fed into a Comparator which in turn feeds the Slave Timer Control.

The Slave Timer Control now increments the Slave Timer by variable amounts, depending on the difference calculated as described above. Since the output value of the Low Pass filter is the only variable value, it essentially defines the output of the Slave Timer Control. Working with relative values and placing the comparator close to the Slave Timer and its control results in a very stable control loop.

As mentioned above, the Timer Unit is placed on the baseboard. When the latter is configured as a VRB, the function is as described above. However, when the baseboard is configured as a VTB, only the Master Timer in the Timer Unit is activated and provides the time stamps for the video frames to be transmitted; the other components of the Timer Unit are disabled.

The hardware of the Timer Unit shown in FIG. 6 is implemented with two incremental counters, the Master Timer being a 32-bit counter, the Slave Timer being a fractional counter with 32 integer bits and 20 fractional bits. The Master Timer increments with a value of one, the Slave Timer increments by an increment value with 1 integer bit and 20 fractional bits. This allows a resolution of about 1 ppm for the Slave Timer and a range from 0 to $(2-2^{-20})$.

As a result of the above described measures, the slave timer outputs the Receiver Reference Time, which matches in average the rate of the master timer in the VTB.

The above described circuit does not yet account for peak network delays in the IP network caused by high traffic. To account for peak network delays the Video Input FIFO introduces a "buffer zone" and such a time difference between frames entering the Video Input FIFO and frames exiting the Video Input FIFO. This time is called Receiver Latency Time. This Receiver Latency Time is adjustable, depending on the peak network delays. If the network has high peak delays, larger receiver latency is necessary. If the network has low peak delays, the receiver latency may be small. When a link between the VRB and the VTB is established, the Receiver Latency Time is determined by round trip measurements between VTB and VRB.

On point to multipoint connections and if two or several VRBs must be Lip-Synchronous, the Receiver Latency Time on all VRBs must be equal. In this case the largest necessary Receiver Latency Time is chosen which is determined by the VTB to VRB connection which has the highest peak network delay. VRBs and VTBs establish the Receiver Latency Time through a standardized time synchronization protocol.

The Video Rate Matching circuit (FIG. 6) is activated when the baseboard is configured as VRB. It provides the video timing signals for the VRB cards. Typical video timing signals are for example pixel clock, horizontal synchronization (HSYNC) and vertical synchronization (VSYNC) pulses. Different video cards need different timing control signals. The Video Rate Matching circuit generates these signals under software control to support different video cards and different video standards.

Figure 7:
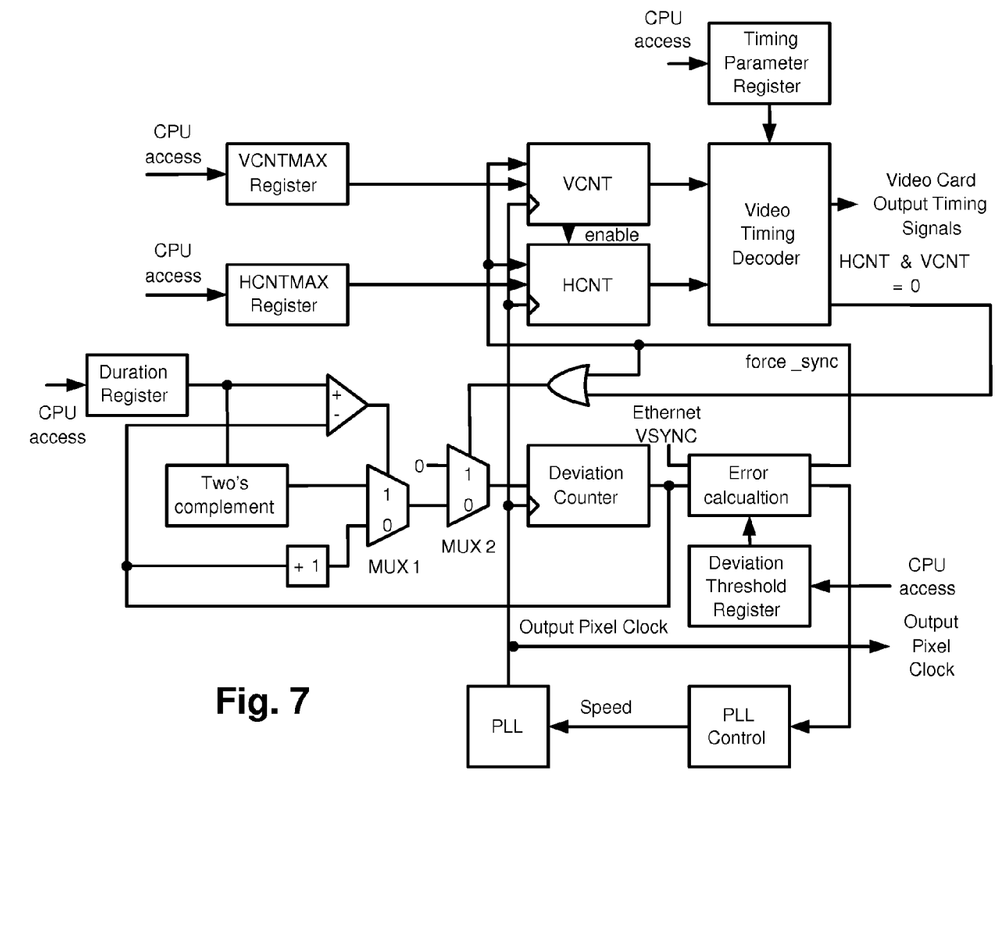
FIG. 7 details of a video timing generator on a baseboard.

FIG. 7 depicts the details of the Video Rate Matching circuit on a baseboard. The Ethernet Frame Unpack unit (FIG. 6) generates a vertical synchronisation pulse Ethernet VSYNC whenever a new video frame arrives whose M-bit is set. The clock driving the components in the Video Rate Matching and the Video Output on the VRB card is called Output Pixel Clock. Since the Ethernet VSYNC is not synchronized to the Output Pixel Clock, it is not suitable to directly drive the circuits on the VRB cards. Therefore the Video Rate Matching circuit generates video timing signals according to the proper rate and synchronous to the output pixel clock.

These Video Card Output Timing signals are derived from two counters HCNT and VCNT, which are free running counters, clocked with the output pixel clock. The counters HCNT and VCNT wrap to zero when the value of the VCNTMAX and HCNTMAX registers are reached. The VCNTMAX and HCNTMAX registers are accessed by the CPU on the baseboard to set them for different video standards. The Video Card Output Timing signals are not only based on the values of HCNT and VCNT, but also affected by an input from the Timing Parameter Register, which is also under control of the CPU set for different video standards and cards.

The Duration Register shown in FIG. 7 is controlled by the CPU. It contains the values of HCNTMAX*VCNTMAX/2, which is half the number of pixels necessary for a video frame.

A Deviation Counter, also depicted in FIG. 7, tracks the deviation between the arriving Ethernet VSYNC timing and the Video Card Output Timing signals. If a deviation exists, the Output Pixel Clock signal is adjusted; the latter clocks the HCNT and VCNT counters such that the video output rate matches the rate of the incoming Ethernet VSYNC signals. Deviation Counter, Error Calculation, PLL Control and PLL form this control loop.

The Deviation Counter is clocked with the Output Pixel Clock which is the same signal which clocks the HCNT and VCNT counters. The counter handles negative numbers (two' complement numbers) and ranges from a negative value to a positive value., namely–duration to+duration.

When an Ethernet VSYNC pulse occurs, the contents of the Deviation Counter is evaluated; if the deviation, i.e. the Ethernet VSYNC time and the VRB card VSYNC time, is below the value of the Deviation Threshold Register, the output pixel clock speed is adjusted either slower or faster, depending on the sign of the deviation value.

If the deviation is above the value of the Deviation Threshold Register, the HCNT and VCNT are reset to zero by the force_sync signal. At the same time, the Deviation Counter is reset to zero as well, such that Deviation Counter, HCNT and VCNT both start synchronized to each other. The Deviation Threshold Register is accessible by the CPU.

If the Deviation Counter reaches the value of the Duration Register, the Counter is reloaded with the two's complement of the Duration Register, which sets the counter to a value of–duration. The counter counts up to a value of+duration, which gives it a range of–(duration+1) to+duration. The reload value is controlled by MUX1. MUX2 loads the value Zero into the counter when force_sync is active or when HCNT and VCNT are passing through zero.

The signal Ethernet VSYNC triggers an error calculation which calculates an error value consisting of one signed integer bit and 5 fractional bits. When the output pixel clock is too fast, the value is positive; when the clock is too slow, the value is negative. The PLL which generates the output pixel clock is adjusted accordingly.

Figure 8:
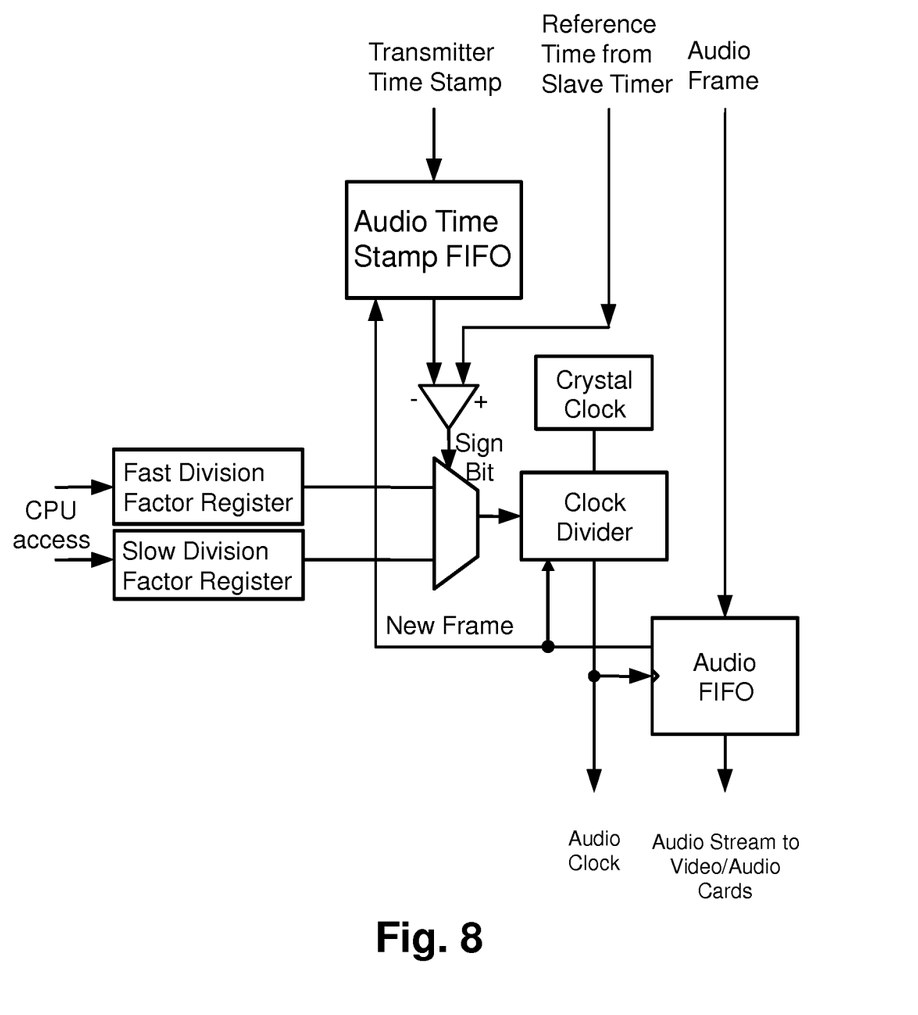
FIG. 8 details of an audio rate matching circuit on a baseboard.

FIG. 8 shows the details of the Audio Clock Generator which implements audio rate matching as a two-step frequency control. This Audio Clock Generator is contained on the baseboard and also shown as block in FIG. 6. The audio clock is generated by a divided crystal clock. There are two fractional division factors programmable through the CPU on the baseboard. The format of the factors is 7 bits integer and 20 bits fractional, this allows generating all common audio clocks in the range of 32 kHz to 192 kHz with a resolution of 1 ppm. The Audio Rate Matching switches between the two factors; this allows implementing a two-step control with a faster clock and a slower clock.

The audio transmitter time stamps, extracted by the Ethernet Frame Unpack unit, see FIG. 6, are fed into the Audio Time Stamp FIFO, as shown in FIG. 8. At the output of this FIFO, the time stamps are compared with the reference time provided by the slave timer. The sign bit of the comparator selects between Fast Division Factor Register and Slow Division Factor Register. The Audio Clock coming from the Clock Divider advances the Audio FIFO which delivers a "New Frame" signal each time a new audio frame arrives at its output. This "New Frame" signal triggers the Audio Time Stamp FIFO to output the next timestamp, which is then compared with the reference time coming from the Slave Timer, see FIG. 6. If the result of the comparison is negative, i.e. the sign bit active, the CPU selects the Fast Division Factor Register, which results in a more frequent arrival of new frames whereupon the time stamps at the output of the Audio FIFO arrive earlier.

If the result of the comparison is positive, i.e. the sign bit inactive, the CPU selects the Slow Division Factor Register, which results in a less frequent arrival of new frames and therefore the time stamps at the output of the Audio FIFO to arrive later.

Figure 9:
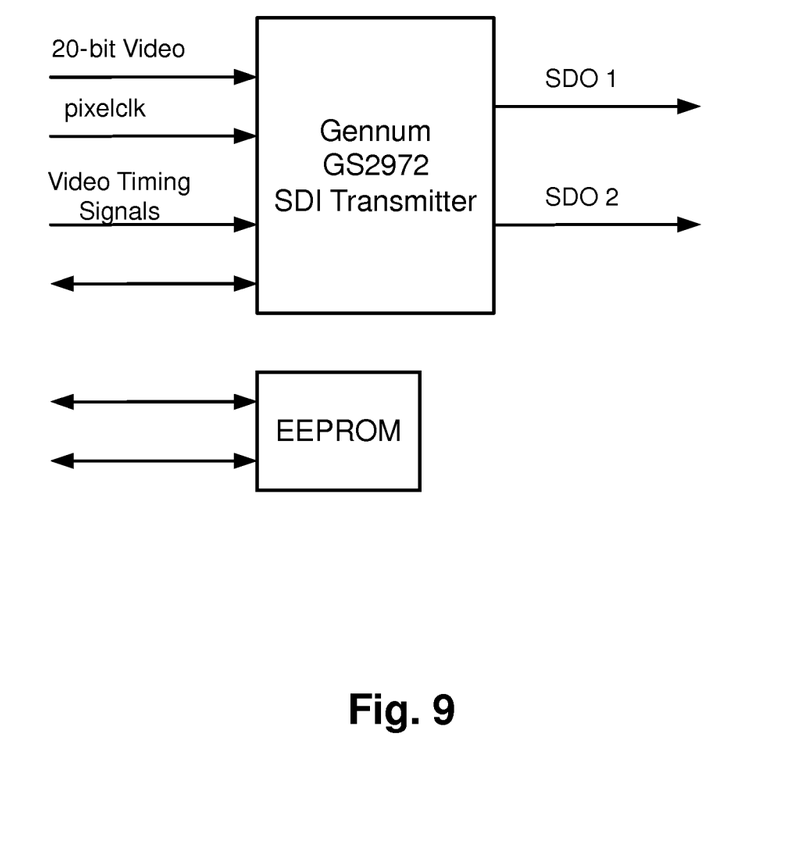
FIG. 9 details of an audio timing generator on a baseboard.

FIG. 9 illustrates a block diagram of a typical SDI transmitter card. This card converts an incoming parallel HD video signal into a Serial Digital Interface (SDI) signal. There are two serial video outputs SDO 1 and SDO 2 available on each card. A Gennum GS2972 from Gennum Corporation, Burlington, Ontario, Canada, is used as transmitter and attaches via a high density connector directly to the FPGA pins of the baseboard. The 20-bit video data signals, the output pixel clock and the video timing signals are directly connected to the Video Rate Matching Unit inside the FPGA. The card contains an EEPROM which identifies the type of the card. The EEPROM can be read out by the CPU on the mainboard by means of an I2C bus.

Figure 10:
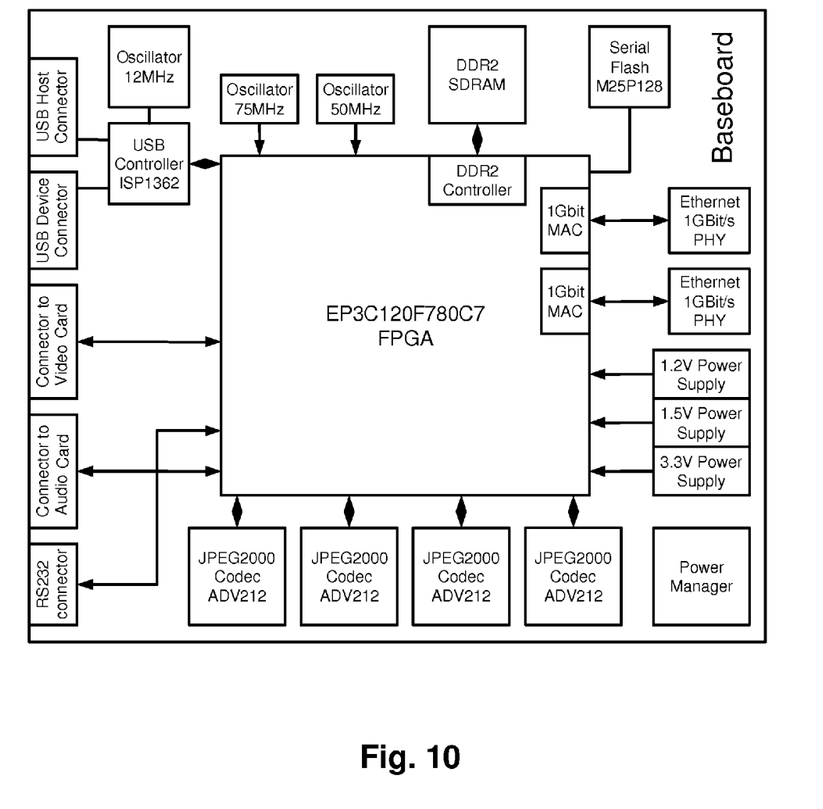
FIG. 10 a block diagram of a typical implemented baseboard with its physical components.

FIG. 10 shows the block diagram of an implemented baseboard with all components. In the center is a 120 k logic element FPGA EP3C120F780C7 from Altera Corp., San Jose, Calif., USA. The system is controlled by a NIOSII softcore processor in the FPGA.

There are two Gigabit Ethernet ports on the baseboard. The Ethernet Media Access Controller (MAC) is integrated into the FPGA logic. Ethernet physical interfaces are external to the FPGA.

Main storage is a 32 MByte DDR2 SDRAM, whose controller is inside the FPGA. For video compression and expansion four ADV212 JPEG2000 processors from Analog Devices Inc., NORWOOD, Mass., USA, are directly connected to the FPGA.

USB host and device controllers external to the FPGA are connected to the system bus of the softcore processor; this allows tunneling of USB 2.0 signals through the Ethernet. Further components on the baseboard are two 50 MHz crystal oscillators for the master and slave timers, a 75 MHz crystal oscillator and a 12 MHz crystal oscillator for the clock of the USB.

A power management circuit manages 1.2, 1.5 and 3.3V supply voltages. Other components shown in FIG. 10 are essentially self-explanatory.

Figure 11:
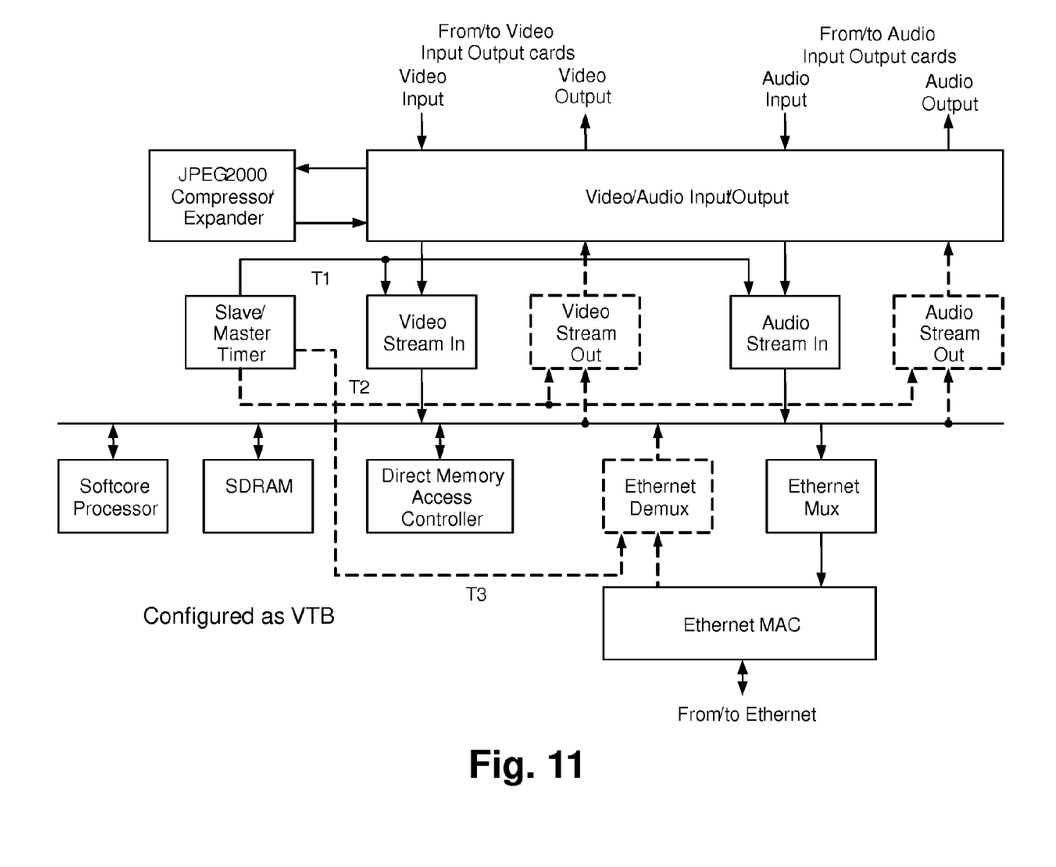
FIG. 11 a baseboard configured as VTB.

FIG. 11 shows components and function of a baseboard when it is configured and functioning as Video Transmitter Box (VTB). Components and connections shown with dashed lines are unused or disabled when the baseboard is configured as VTB. As explained above, the configuration depends on the adapter plugged-in cards. In the present example, it suffices that, e.g., an SDI VRB card as shown in FIG. 9 is plugged into a baseboard.

Video frames entered from one or more video cards are compressed by the JPEG2000 Processor. The latter operates in compression mode when the baseboard is configured as VTB. The data streams for the JPEG2000 Processor are managed by the Video/Audio Input/Output block.

Video packets coming in from the Video/Audio Input/Output are time stamped in the Video Stream In block. Analagously are audio packets coming in from the Video/Audio Input/Output time-stamped in the Audio Stream In block. The T1 timestamps are generated by a Slave/Master Timer which operates as master timer when the baseboard is in VTB mode.

The Direct Memory Access Controller shown in FIG. 11 transfers the packet streams to SDRAM after it has split the packets into smaller burst. Data in SDRAM is organized as ring buffers functioning as FIFOS for video and audio packets.

The softcore processor (CPU) stores packets for VTB (and also for VRB) communication in an internal ring buffer. The Ethernet Mux block functions as a multiplexer picking packets out of this CPU ring buffer for video, audio and control packets generated by the CPU and sends them to the Ethernet MAC, from where they are transferred into the Ethernet.

Figure 12:
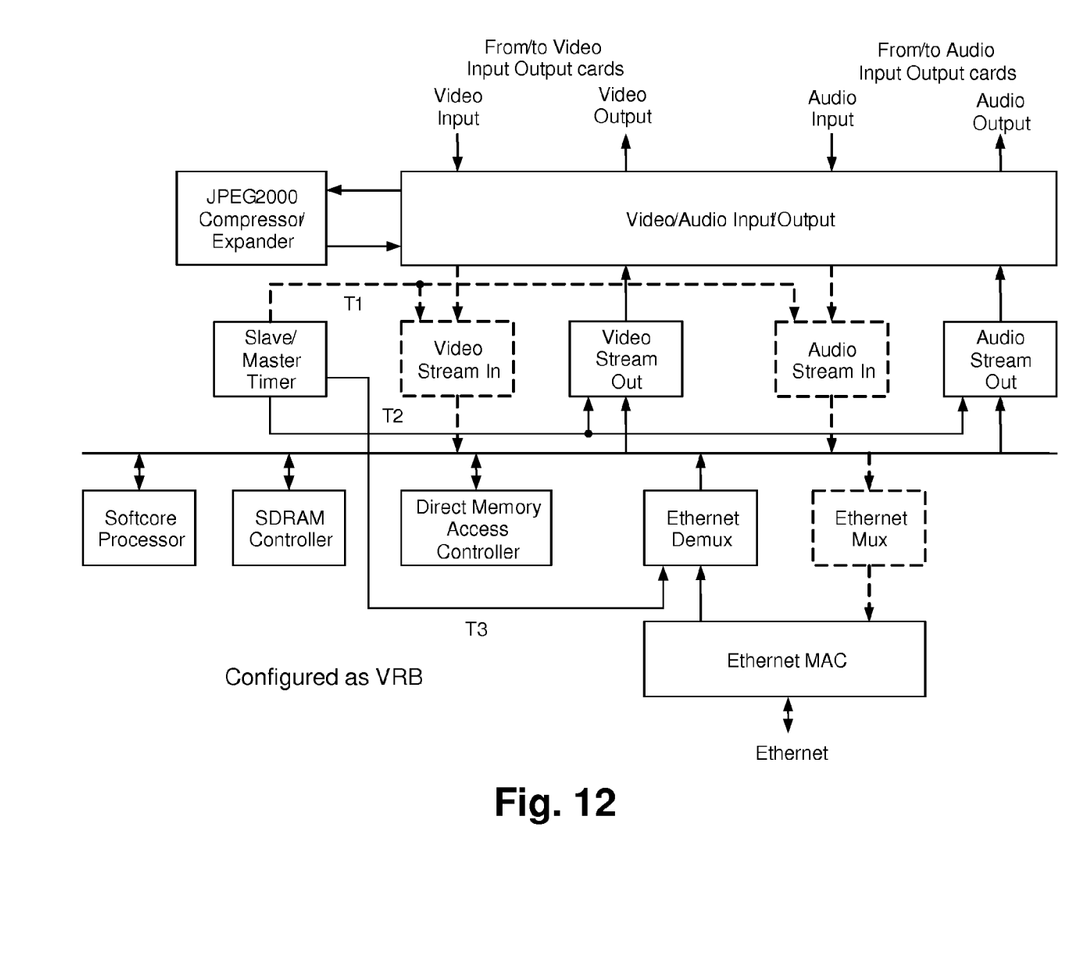
FIG. 12 a baseboard configured as VRB.

FIG. 12 shows components and function of a baseboard when it is configured and functioning as Video Transmitter Box (VTB). Components and connections shown with dashed lines are unused or disabled when the baseboard is configured as VTB.

Received Ethernet packets are conveyed from the Ethernet MAC to the Ethernet Demultiplexer which splits the packets into audio, video and control packets and fills them into virtual ring buffers realized with SDRAM. The Demultiplexer adds receiver time stamps T3 from the Slave Master Timer to be stored along the video and audio streams in the receiver ring buffer. The Video and Audio Stream Out blocks unpack the encoded video stream and the audio stream, provide the rate matching and pass them to the Video/Audio Input/Output block. Time stamps T2 from the Slave/Master Timer are used as reference time for the video and audio rate matching. Transferring data to and from the SDRAM memory happens under DMA control. When the baseboard is configured as VRB, the JPEG2000 processor operates as an expander. Encoded Video streams and audio streams are sent to the video and audio I/O cards.

Based on the above, a person skilled in the art can easily vary the design and the functions described above and adapt them to other implementations without departing from the inventive gist as defined in the appended claims.

The invention claimed is:

1. Modular system for transmitting digital High Definition (HD) video/audio data in a packet switching network, said system including a transmitter for generating time-stamped data packages and a receiver for receiving said data packages, the video data being transmitted separately from the audio data, characterized in each said transmitter (VTB) and said receiver (VRB) consisting of a first module or baseboard and at least one second module or card removably connectable to said first module, each said card being dedicated distinctly either for a VTB as audio/video data receive card (VTB card) or for a VRB as audio/video data outputting card (VRB card) and including means earmarking said card as a VTB card or a VRB card, respectively, said baseboard being identical for both the VTB and the VRB, but being configurable for a transmitting mode or a receiving mode, each said baseboard including a plurality of connectors, each for removably receiving one of said cards, means for identifying an earmark of the card when it is connected to said baseboard, including identifying whether said card is a VTB card or a VRB card, and means for configuring said baseboard, depending on the earmark on said card, as transmitter baseboard when the card is identified as VTB card or as receiver baseboard when the card is identified as VRB card.

2. The system according to claim 1, wherein the baseboard includes baseboard connectors of different forms, in particular a first form for removably accommodating audio cards and a second form for removably accommodating video cards.

3. The system according to claim 2, wherein each card includes a card connector matching a baseboard connector and an earmark comprising stored information on a type of card, on a supported audio and/or video standard, and/or on a required power supply.

4. The system according to claim 3, wherein each card includes a data storage containing the earmark in digital form.

5. The system according to claim 4, wherein the card connector and the baseboard connector comprise contacts for digital data input and/or output, said contacts being individually configurable by the affiliated baseboard as inputs, outputs, or bidirectional when a card is identified, contacts for reading out the data storage on a card, and/or contacts for supplying power to a card.

6. The system according to claim 3, wherein the card includes an earmarking implemented as a card connector and comprising, in mechanical structure and/or electrical form, information on a type of card, on supported audio or video standards and/or on a required power supply.

7. The system according to claim 1, wherein the baseboard includes a processor, associated with the connectors, said processor identifying the earmark of a connected card and, depending on the identified earmark, configuring said baseboard as baseboard in a transmitting mode or as baseboard in a receiving mode, said configuring including activating or deactivating components on said baseboard depending on a desired functionality.

8. The system according to claim 1, wherein the baseboard includes a processor for controlling one or more of the following functions of said baseboard: connection to an IP network, power supply, processing data packages including encoding/decoding and/or timing control/adaptation and/or compression/decompression, individual configuration of data I/O pins or contacts of an affiliated card, an interface, preferably an RJ45 connector, for connecting said baseboard to the IP network for transmitting or receiving video and audio data packages, video input and output buffers, and audio input and output buffers, said input and output buffers being preferably FIFO buffers.

9. The system according to claim 1, wherein the baseboard includes a fixed-frequency timer or master timer and a variable-frequency timer or slave timer, said master timer being activated in transmission mode, thereby effecting an individual transmitter timestamp on each generated packet, said slave timer being activated in receiving mode, thereby generating an individual receiver timestamp on each received packet, said individual receiver timestamp being generated by advancing said slave timer after a variable number of clocks of a base timer with a fixed base frequency, said base timer frequency being higher than the frequency of the transmitter's master timer, said variable number of clocks being adjusted depending on the value of said transmitter timestamp relative to the value of said receiver timestamp.

10. The system according to claim 1, wherein the baseboard includes in the receiving mode means activated for combining, especially synchronizing, video and audio data received.

11. The system according to claim 1, wherein the baseboard includes in the receiving mode means for matching the rate of video output signals to the rate of arriving video signals, said means comprising a deviation counter and a PLL loop tracking the deviation between arriving video timing signals and video output timing signals and, if a deviation exists, adjusting an output clock such that the video output rate matches the rate of the incoming video signals.

12. The system according to claim 1, wherein a VTB card includes a first interface for receiving analog or digital video and/or audio data, a coder for transcoding said data, as second interface for delivering said transcoded data to an affiliated baseboard, and a memory, in particular an EEPROM, for storing information about supported video standards and mounted components.

13. The system according to claim 12, wherein the VTB card further includes means for receiving standard video signals and means for transmission clock recovery.

14. The system according to claim 1, wherein the VRB card includes a first interface for receiving digital data from an associated baseboard, a coder for transcoding said digital data, a second interface delivering said transcoded data to display and/or audio equipment and a memory, in particular an EEPROM, for storing information about supported video standards and mounted components.

15. The system according to claim 14, wherein each VRB card further includes means for delivering standard video signals and means for transmission clock generation.

16. The system according to claim 1, wherein the baseboard includes
a plurality of video encoders/decoders, each of said encoders/decoders being separately activatable for encoding/decoding video data in parallel to adapt said system to a required transmission capacity of the network, in particular by transposing the compression ratio of transmitted or received video data.

17. The system according to claim 16, wherein the baseboard includes
a plurality, in particular four, of video encoders/decoders, a first fraction of said plurality being activated for processing luminance data of transmitted or received video data and a second fraction being activated for processing chrominance data.

18. The system according to claim 16, wherein the baseboard includes
a plurality, in particular four, of video encoders/decoders, a first fraction of said plurality being activated for processing a first half of a line on a display of transmitted or received video data and a second fraction being activated for processing a second half of a line.

19. The system according to claim 1 having a plurality of VRBs connected to a single VTB in a broadcasting arrangement, wherein
said VTB comprises a master timer for generating a synchronizing signal and means for transmitting said synchronizing signal to said VRBs,
each said VRB comprises a slave timer and means for determining an individual timing offset between said master timer and each said slave timer,
a synchronization protocol, running between said VTB and said VRBs, provides for normalization of said individual timing offsets to lip-synchronize the audio and/or video output of said VRBs.

20. The system according to claim 1 having a single VRB connected to a plurality of VTBs, comprising
providing a master timer for generating a master synchronizing signal in said VRB or one of said VTBs,
providing slave timers for generating individual timing offsets from said master synchronizing signal in the remaining VTBs or said VRB, and
running a synchronization protocol between said VRB and said VTBs, said protocol for normalization of said individual offsets to synchronize the audio and/or video output of said VTBs.

* * * * *